Figure 1:
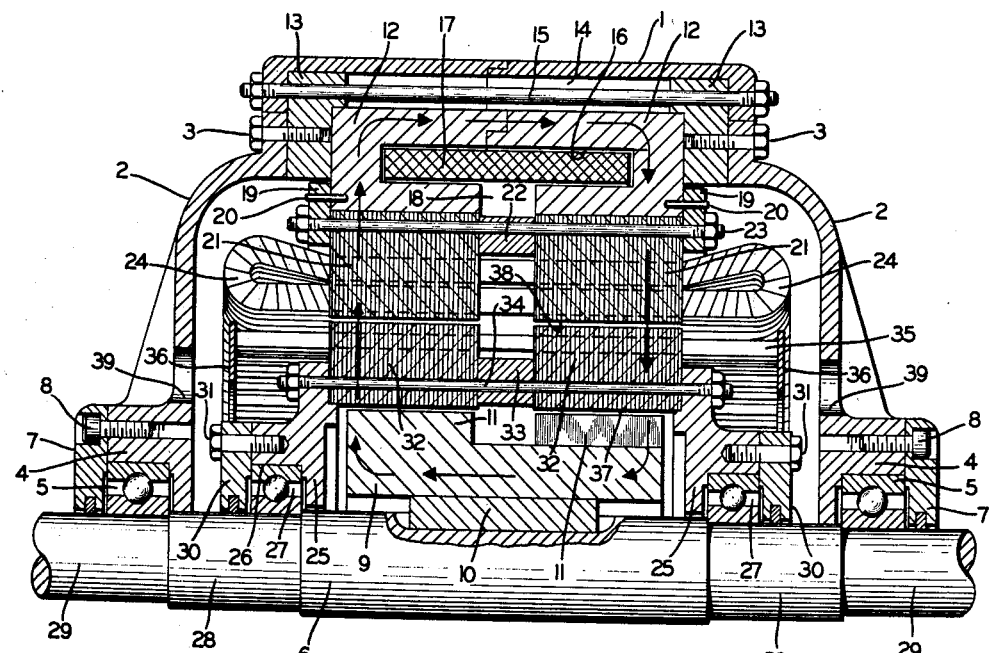

INVENTOR.
Frank P. Fehn
BY
ATTORNEYS

United States Patent Office 3,075,108
Patented Jan. 22, 1963

3,075,108
DUAL ROTOR ELECTRIC MOTOR
Frank P. Fehn, 523 23rd St. NW., Canton, Ohio
Filed Aug. 8, 1961, Ser. No. 130,064
7 Claims. (Cl. 310—126)

The invention relates to electric motors and more particularly to a combination of a motor of the synchronous (fixed speed) type and the simple polyphase squirrel-cage type.

The common polyphase squirrel-cage type induction motor converts alternating current into mechanical power with ideal simplicity and reliability. The principal shortcoming of this type of motor is its inability to run efficiently at reduced speed, because all of the power represented by the slip times the output torque is dissipated in rotor heating.

A second disadvantage of this type of motor is the relatively high starting current required for adequate running efficiency and good starting torque to drive a shaft load.

A primary object of the invention is to combine the useful characteristics of a fixed speed motor and a variable speed dynamo-electric machine, by providing concentric direct-current fields, an alternating-current stator, a concentric distributed cage-wound alternating-current coaxial rotor, and an extended, spaced, alternate pole, direct-current rotor, without the use of collector rings, commutators or brushes.

Another object of the invention is to provide a dual rotor electric motor wherein one of the rotors is started independently of a connected load.

A further object of the invention is to provide a motor of the character referred to in which the cage rotor is allowed to run at constant speed for improved power requirements and adequate cooling respectively.

A still further object of the invention is to provide such a motor in which the mass of the output rotor is reduced for improved speed response.

Another object of the invention is to provide a low-cost synchronous machine for constant speed loads and power-factor correction in polyphase systems.

The above and other objects, apparent from the drawing, and following description, may be attained, the above described difficulties overcome and the advantages and results obtained, by the apparatus, construction, arrangement and combinations, subcombinations and parts which comprise the present invention, a preferred embodiment of which, illustrative of the best mode in which applicant has contemplated applying the principle, being set forth in detail in the following description and illustrated in the accompanying drawing.

In general terms, the invention may be briefly described as comprising a dual rotor electric motor which combines an alternating-current stator core, and a direct-current field core and their respective windings in a stationary housing with a distributed cage-wound rotor coaxially and rotatably mounted on a shaft over a second rotor having extended, spaced, alternate poles.

The second rotor is keyed to the shaft. The cage-wound rotor is free to rotate on the shaft and follow the rotating forces induced by the alternating-current windings. The extended, spaced, alternate-pole rotor will follow the cage-wound rotor when linked thereto by magnetic flux lines from the direct-current field poles when the field coil is excited.

The application of polyphase power to the stator winding results in development of a rotating magnetic field. Magnetic lines of force developed by this rotating field cut across the cage bars and generate voltages, causing currents at slip frequency to flow in them. The interaction between these currents and the rotating magnetic field develops torque, tending to turn the distributed cage-wound rotor in the same direction as the rotating magnetic field. Some applications may require double-cage windings to provide proper torques.

Figure 2:
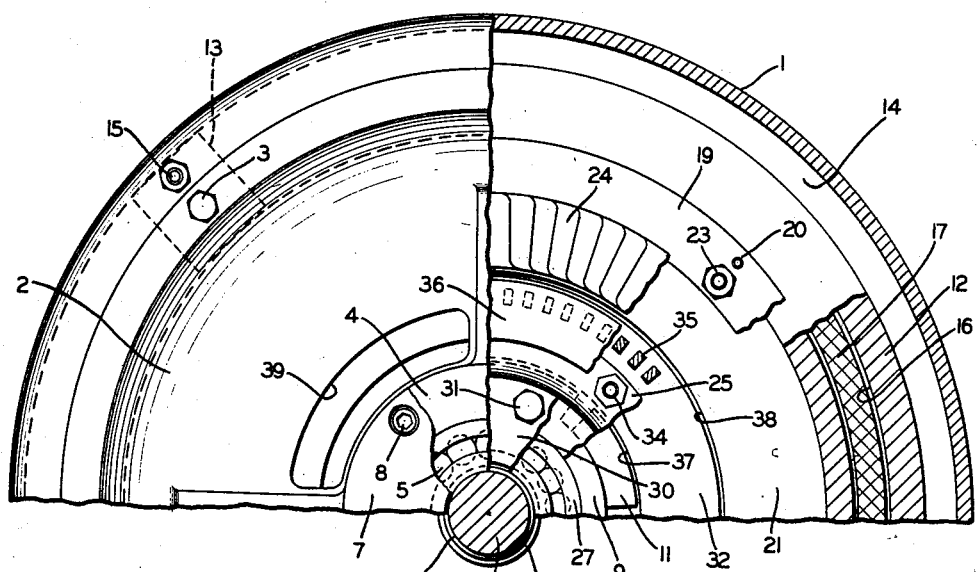

In the accompanying drawing:
FIG. 1 is a sectional view through the upper half of a dual rotor electric motor embodying the invention; and
FIG. 2 is an end view of the same, parts being broken away for the purpose of illustration.

Referring now more particularly to the embodiment of the invention illustrated, in which similar reference characters refer to similar parts throughout, it will be understood that while only the upper half of the motor is shown in the drawing, the lower half is symmetrical therewith except for the addition of the conventional mounting feet and air discharge.

The motor is enclosed within a stationary housing 1 having the end shields 2 attached to opposite ends thereof by the cap screws 3. A motor shaft bearing housing 4 is formed at the center of each end shield 2, within which are mounted anti-friction bearings, such as the conventional ball bearings 5 within which the motor shaft 6 is journalled.

Each of the motor shaft bearings is enclosed within the corresponding bearing housing 4, by a motor shaft bearing cap 7, attached to the bearing housing by the cap screws 8.

An extended and spaced ferro-magnetic pole rotor 9 is fixed upon the motor shaft 6, centrally of the motor shaft bearings 5, as by the key 10. Around the periphery of the rotor 9, at opposite sides thereof, are two spaced annular rows of alternately located spaced poles 11.

The direct-current field poles 12 are mounted within the housing 1 and spaced therefrom by means of the diamagnetic spacers 13, providing an annular air passageway 14 between the periphery of the field poles 12 and the interior of the housing.

As best shown in FIG. 1, the diamagnetic spacers 13 are attached to the end shields 2 by the end shield cap screws 3, and are attached to the housing 1 by the housing tie rods 15.

The direct-current field poles 12 have an annular groove 16 therein, within which is mounted the direct-current field coil 17. An air gap 18 is formed between the direct-current field poles 12 at the inner side of the direct-current field coil 17.

A direct-current field pole clamp ring 19 is attached to each end of the direct-current field poles 12, as by the dowel pins 20. An alternating-current stator is mounted within the direct-current field poles 12, and comprises two spaced, similar sections 21—21, separated by the diamagnetic, alternating-current stator isolating spacers 22.

The axial spacing of the two rows of poles 11 on the rotor 9 may be symmetrical with the spacers 22 and the direct-current field gap 18 to provide maximum air gap flux densities.

The alternating current stator is attached to the D.C. field pole clamp rings 19 by the diamagnetic A.C. stator tie rods 23. The alternating-current field coils are shown at 24. A cage-wound rotor is rotatably mounted upon the motor shaft 6, by means of the diamagnetic hubs 25 having bearing sockets 26 therein which house anti-friction bearings, such as the conventional ball bearings 27 surrounding the stepped portions 28 of the motor shaft.

It will be noted that the motor shaft bearings 5 are located around further reduced portions 29 of the shaft. Cage rotor bearing caps 30 enclose the cage rotor bearings 27 and are attached to the cage rotor hubs 25 by the cap screws 31.

The distributed cage-wound rotor is formed in two annular sections 32—32, spaced by the diamagnetic cage rotor isolating spacers 33, and attached to the hubs 25 by the diamagnetic cage rotor tie rods 34. The isolating diamagnetic spacers 33 separate the cage rotor at the center to form two electromagnetic paths, one for each of the annular series of spaced poles 11 on the pole rotor 9.

The cage bars 35 are attached at opposite ends to the end rings 36. Working air gaps 37 and 38 are provided between the extended and spaced pole rotor 9 and the cage-wound rotor 32, and between the cage-wound rotor and the alternating-current stator 21. Air vents 39 are provided in the end shields 2.

In operation of the dual rotor motor, during starting and and accelerating of the cage-wound rotor 21, the direct-current field is kept idle. When the cage rotor has reached rated speed, the direct-current field coil 17 is energized.

The application of direct-current to the stationary direct-current field coil winding 17 results in development of a stationary magnetic field in the direct-current field poles 12. Magnetic lines of force developed by the direct-current field poles passes through the stator core 21, between the cage bars 35 in the cage rotor 32—32, through the cage rotor, into the poles 11 on the extended pole rotor 9, and in reverse order back to the opposite direct-current field pole, as indicted by the arrows in FIG. 1.

The magnetic lines of force entering and leaving the extended pole rotor 9 cut the rotating bars of cage-wound rotor and generate voltages, causing currents to flow in the cage bars at frequencies which represent the difference in speed between the two rotors.

The interaction between these currents and the extended pole rotor magnetic lines of force develops torque tending to turn the extended pole rotor in the same direction as the cage rotor. Below synchronous speed a pulsating torque, called reluctance torque is developed by magnetic flux cutting the cage bars. The stator rotating magnetic field will also add pulsations of a minor level.

The extended pole rotor 9 may be provided with an equal group of poles to those in the stator winding for synchronous service, a greater number for variable speed or an odd number to subdue electrical and mechanical disturbances.

The invention combines an alternating-current stator core and a direct-current field core and their respective windings in a stationary housing with a distributed cage-wound rotor coaxially and rotatably mounted on a shaft to which is fastened a radially extended and axially spaced pole rotor.

More specifically, the cage-wound rotor is free to rotate on the shaft and follow the rotating forces induced by the alternating-current windings, the extended pole rotor will follow the cage rotor when linked to the cage rotor by magnetic flux lines from the direct-current field when field coil is excited.

The extended pole rotor may be provided with a group of poles equal to those in the alternating-current fields and, in this case it may be used as a synchronous machine or, when extended pole rotor has a greater number of poles it may be used as a variable speed machine.

The laminated, cage-wound rotor is swept by the radial alternating-current field forces and by the combination radial and axial direct-current field force induced by the two circular series of inner rotor poles. The continuously rotating distributed cage-wound rotor provides an effective air-cooling means for all heat generated by slip currents of both inner and outer rotors.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. A dual rotor electric motor including a stationary housing, a motor shaft journalled in the housing, a D.C. extended-pole rotor fixed upon the shaft, a cage-wound rotor rotatably journalled on the shaft and surrounding the D.C. extended-pole rotor, D.C. field poles fixed in the housing, a D.C. field coil located in said field poles, an A.C. stator fixed to the D.C. field poles and surrounding said cage-wound rotor, and A.C. field coils in said A.C. stator.

2. A dual rotor electric motor including a stationary housing, a motor shaft journalled in the housing, a D.C. extended-pole rotor fixed upon the shaft, a cage-wound rotor rotatably journalled on the shaft and surrounding the D.C. extended-pole rotor, D.C. field poles fixed in the housing, diamagnetic spacers between said D.C. field poles and the housing, a D.C. field coil located in said field poles, an A.C. stator fixed to the D.C. field poles and surrounding said cage-wound rotor, and A.C. field coils in said A.C. stator.

3. A dual rotor electric motor including a stationary housing, a motor shaft journalled in the housing, a D.C. extended-pole rotor fixed upon the shaft, a cage-wound rotor rotatably journalled on the shaft and surrounding the D.C. extended-pole rotor, D.C. field poles fixed in the housing, there being a centrally located groove in said D.C. field poles, a D.C. field coil located in the groove in said field poles, there being an air gap between said D.C. field poles, an A.C. stator fixed to the D.C. field poles and surrounding said cage-wound rotor, and A.C. field coils in said A.C. stator.

4. A dual rotor electric motor including a stationary housing, a motor shaft journalled in the housing, a D.C. extended-pole rotor fixed upon the shaft, two annular rows of spaced poles upon said D.C. extended-pole rotor, a cage-wound rotor rotatably journalled on the shaft and surrounding the D.C. extended-pole rotor, said cage-wound rotor being separated at the center to form two electromagnetic paths, one for each of the D.C. field poles, D.C. field poles fixed in the housing, there being a centrally located groove in said D.C. field poles, a D.C. field coil located in the groove in said field poles, there being an air gap between said D.C. field poles, an A.C. stator fixed to the D.C. field poles and surrounding said cage-wound rotor, and A.C. field coils in said A.C. stator.

5. A dual rotor electric motor including a stationary housing, a motor shaft journalled in the housing, a D.C. extended-pole rotor fixed upon the shaft, two annular rows of spaced poles upon said D.C. extended-pole rotor, a cage-wound rotor rotatably journalled on the shaft and surrounding the D.C. extended-pole rotor, said cage-wound rotor being separated at the center to form two electromagnetic paths, one for each of the D.C. field poles, D.C. field poles fixed in the housing, there being a centrally located groove in said D.C. field poles, a D.C. field coil located in the groove in said field poles, there being an air gap between said D.C. field poles, an A.C. stator fixed to the D.C. field poles and surrounding said cage-wound rotor, said A.C. stator being separated at the center corresponding to the cage-wound rotor, and A.C. field coils in said A.C. stator.

6. A dual rotor electric motor including a stationary housing, a motor shaft journalled in the housing, a D.C. extended-pole rotor fixed upon the shaft, two annular rows of alternately located spaced poles upon said D.C. extended-pole rotor, a cage-wound rotor rotatably journalled on the shaft and surrounding the D.C. extended-pole rotor, said cage-wound rotor being separated at the center to form two electromagnetic paths, one for each of the D.C. field poles, D.C. field poles fixed in the housing, there being a centrally located groove in said D.C. field poles, a D.C. field coil located in the groove in said field poles, there being an air gap between said D.C. field poles, an A.C. stator fixed on the D.C. field poles and surrounding said cage-wound rotor, and A.C. field coils in said A.C. stator.

7. A dual rotor electric motor including a stationary housing, a motor shaft journalled in the housing, a D.C. extended-pole rotor fixed upon the shaft, a cage-wound rotor rotatably journalled on the shaft and surrounding the D.C. extended-pole rotor, D.C. field poles fixed in the housing, there being a centrally located groove in said D.C. field poles, a D.C. field coil located in the groove in said field poles, there being an air gap between said D.C. field poles, an A.C. stator fixed to the D.C. field poles and surrounding said cage-wound rotor, diamagnetic spacers between said D.C. field poles and the housing, diamagnetic spacers separating the A.C. stator at the center, diamagnetic spacers separating the cage-wound rotor at the center, and A.C. field coils in said A.C. stator.

No references cited.